United States Patent
Hsu

(10) Patent No.: US 7,632,414 B2
(45) Date of Patent: Dec. 15, 2009

(54) PROCESS FOR SUPPRESSING THE GROWTH OF GREEN ALGAE IN AQUEOUS SYSTEMS

(76) Inventor: Kenneth J. Hsu, Oak Combre Marley Common, Haslemere GU27 3PT (GB)

( * ) Notice: Subject to any disclaimer, the term of this patent is extended or adjusted under 35 U.S.C. 154(b) by 428 days.

(21) Appl. No.: 10/564,830

(22) PCT Filed: Jul. 17, 2003

(86) PCT No.: PCT/CH03/00482

§ 371 (c)(1),
(2), (4) Date: Feb. 22, 2006

(87) PCT Pub. No.: WO2005/007586

PCT Pub. Date: Jan. 27, 2005

(65) Prior Publication Data

US 2006/0151402 A1    Jul. 13, 2006

(51) Int. Cl.
    *C02F 1/50* (2006.01)
(52) U.S. Cl. ............................. 210/764; 71/11; 504/151
(58) Field of Classification Search ................... 210/764
    See application file for complete search history.

(56) References Cited

U.S. PATENT DOCUMENTS

| | | | | |
|---|---|---|---|---|
| 2,359,748 A | * | 10/1944 | Clemens | 210/711 |
| 3,072,134 A | * | 1/1963 | Williamson | 137/114 |
| 3,428,559 A | * | 2/1969 | McInnis | 210/752 |
| 3,546,111 A | * | 12/1970 | Busch | 210/603 |
| 3,654,149 A | * | 4/1972 | Hedgpeth | 210/752 |
| 3,756,220 A | | 9/1973 | Tehrani et al. | |
| 3,833,463 A | * | 9/1974 | Croom | 162/29 |
| 3,947,350 A | * | 3/1976 | Cardinal, Jr. | 210/711 |
| 5,039,427 A | | 8/1991 | Conover | |
| 5,851,398 A | * | 12/1998 | Adey | 210/602 |
| 5,944,986 A | * | 8/1999 | Saho et al. | 210/173 |
| 6,207,062 B1 | * | 3/2001 | de Rigaud | 210/724 |
| 6,258,280 B1 | | 7/2001 | Petrich | |
| 6,447,681 B1 | | 9/2002 | Carlberg et al. | |
| 6,524,487 B2 | | 2/2003 | Kulperger et al. | |

FOREIGN PATENT DOCUMENTS

| | | |
|---|---|---|
| DE | 2 255 734 | 5/1974 |
| JP | 10-235377 | 9/1998 |
| JP | 2001-149945 | 6/2001 |
| WO | WO 93/21115 A1 | 10/1993 |

* cited by examiner

*Primary Examiner*—Peter A Hruskoci
(74) *Attorney, Agent, or Firm*—Breiner & Breiner, LLC

(57) ABSTRACT

The process for suppressing the growth of green algae in aqueous systems, such as lakes or rivers, comprises introducing carbon dioxide, preferably industrially produced carbon dioxide, into the water to be treated, thereby acidifying the water and suppressing the growth of green algae and promoting the growth of diatoms. The carbon dioxide can be produced by industry. Thus disposal of such industrially produced gases for acidification of waters serves for cleaning water and leads at the same time to clean air.

3 Claims, No Drawings

PROCESS FOR SUPPRESSING THE GROWTH OF GREEN ALGAE IN AQUEOUS SYSTEMS

The present invention relates to the suppressing of the growth of green algae in aqueous systems, such as lakes or rivers.

The luxuriant growth of green algae causes pollution of lakes and rivers. The plankton growth has been commonly attributed to nutrient enrichment. Studies of plankton ecology have indicated that the kind of algae growth in waters depends upon the pH of the waters: green algae in alkaline waters and siliceous algae or diatoms in acidic waters. The alarming green algae growth in lakes and rivers is related to the increase of pH of the polluted waters. This invention teaches a method to acidify lake or river waters to suppress the growth of green algae and to promote the growth of diatoms.

BACKGROUND OF THE INVENTION

Lakes and rivers are polluted because the composition of their water has been changed. One object of the present invention is an approach to revert polluted lakes and rivers to their originally pristine conditions.

In mountains where the drainage basins are underlain by granites or other crystalline rocks, the lake water is nearly neutral or somewhat acidic. The pH value is less than 7, commonly ranging from 5.5 to 6.5. Diatoms are the common plankton that bloom in those lakes. In places, the lake water is even more acidic. Where the pH of lake water drops below 5 no organisms, not even diatoms, could survive. The lake water is crystal-clear, but it is also sterile.

In foothills or plains county, where the drainage basins are underlain by limestones or other sedimentary rocks, the lakes are mostly alkaline. Limestones or other carbonate rocks are present to provide carbonate ions to buffer the acidity. The pH value of Lake Zurich water, for example, ranges from about 7.4 in the spring to 8.85 in the summer. Green algae are the most common plankton in alkaline lakes.

Case history studies of Lake Zurich, of Er-Hai and Dian-Ci lakes of Yunnan, China revealed that the most significant chemical change of those polluted lakes is the increase of pH of the lake water. The maximum pH value of water is more than 8.5 in Lake Zurich an in Er-Hai and more than 9 in Dian-Ci. The increase of alkalinity favours the growth of green algae and the precipitation of lacustrine chalk.

Paleolimnological studies in Switzerland and elsewhere confirm that the kind of plankton growth in lakes depends upon the pH of lake water. In studying the varves of Lake Zurich, for example, it was noted that diatom frustules are the sediment of the spring and lacustrine chalk, precipitated by green algae, is the sediment of summer and autumn. The winter varve is commonly clay-sized detritus. The changing composition of the plankton reflects the changing pH of Lake Zurich water. After the spring overturn of lake water, the bottom water, which is only slightly alkaline, reaches the surface. A mixing gives the surface water a minimum pH value of about 7.5 in April. The spring is the season of diatom blooms in the nutrient-rich lake water. Consequently the spring varve is rich in diatom frustules. With the coming of summer, diatoms ceases to reproduce, and green algae become the predominating plankton. The pH of lake water is increased some 10-fold to 8.7 or 8.8, accompanied by the precipitation of calcite, which forms the lacustrine chalk in the summer varve. The plankton growth was inhibited during the winter, before the annual cycle of varve-sedimentation starts again with the diatom blooms of the spring.

This knowledge of plankton ecology forms the theoretical basis of the invention. It is true that the growths of diatoms and of green algae both require nutrients, but the predominating plankton may be diatoms or green algae; their growth depends upon the season and the pH of lake waters. Diatoms can reproduce only in the spring. They could grow in slightly alkaline lake waters, but they alone could survive in the acidic waters of mountain lakes. The growth of green algae is suppressed in waters where the diatoms bloom. The growth is suppressed in the spring and is inhibited in acidic waters. The green algae become, however, the predominating plankton in polluted lakes where the lake water is extremely alkaline, even in the spring when diatoms should bloom. This is the critical factor causing the pollution of lake and river waters by green algae.

Considerable efforts have been expended to suppress the growth of green algae through attempts to reduce the nutrients concentrations in lake waters. Those efforts have not been successful. Furthermore, the nutrients are not necessarily harmful, if the lake plankton are diatoms rather than green algae. Not the plankton growth, but the kind of plankton growth is the key to solving the pollution problem. Green algae are commonly not consumed by fish. Special kinds of fish introduced to Dian Ci Lake could consume, but not digest, green algae. The fish excrement consists of diminutive debris to be suspended in lake water to cause worse pollution. In natural waters where green-algae growth is suppressed, rich nutrients are consumed by diatoms. Diatoms are good feed for fish, and the diatom-fed fish excrement is in the form of faecal pellets.

Consequently, mountain lakes hosting diatoms are good breeding ground for fish, and the lake water is commonly crystal-clear because diatom frustules and faecal pellets fall rapidly to the bottom of the lake.

DESCRIPTION OF THE PRIOR ART

Lakes and rivers are biologically polluted through the growth of green algae. The plankton growth has been attributed to nutrient enrichment as a consequence of use of chemical fertilizers and of urban development. Current proposals emphasize 1. Control of nutrient concentrations in polluted water through biological or chemical treatments (U.S. Pat. Nos. 5,039,427; 6,447,681; 6,524,487).
2. Suppression of the growth of target aquatic organisms through the introduction of special chemicals, aquatic organisms, or other foreign substances (U.S Pat. Nos. 5,069,717; 5,380,762; 6,297,193; 6,340,468; 6,391,201; 6,576,594; 6,391,619; 6,576,674).

The shortcomings of those known methods are that they are not cost-effective and that the foreign substances introduced to suppress the algal growth may be toxic and detrimental to health.

SUMMARY OF THE INVENTION

It is a general object of the present invention to provide a new process for suppressing the growth of green algae in aqueous systems, thereby avoiding the disadvantages of known procedures.

The surprisingly simple solution consists in treating the water with carbon dioxide to thereby acidify the water, particularly by using industrially produced carbon dioxide thus not only clearing up the water but also resulting in cleaner air.

Theoretical Considerations

Carbon dioxide dissolved in natural water makes it a very dilute carbonic acid. Carbonic acid is then further dissociated into positive hydrogen ions and negative bicarbonate and carbonate ions. The relative abundance of the three species $H_2CO_3$, $HCO_3^-$ and $CO_3^{2-}$ is controlled by the pH of the water. In acid waters the dissolved carbon dioxide exists in the form of the weak carbonic acid $H_2CO_3$. In slightly acidic or slightly alkaline water, the bicarbonate ion $HCO_3^{2-}$ is the dominant dissolved species. In very alkaline water with pH greater than 9, the carbonate ion $CO_3^{2-}$ becomes dominant. The concentration of carbonate ions is, however, also controlled by the equilibrium of calcite precipitation. Precipitation starts when the calcium and carbonate ionic product exceeds the equilibrium value. Precipitation of carbonate causes further depletion of dissolved carbon dioxide and renders the water even more alkaline.

The decay of organic matter is a source of carbon dioxide in natural waters. The bottom water of a-deep lake is less alkaline than surface water because of the dissolution of biogenically produced carbon dioxide. When the bottom water is brought up to the surface in the spring at the time of diatom bloom, the photosynthesis of the siliceous algae plankton causes a slight depletion of dissolved carbon dioxide to make protoplasm. There is then an increase in pH, and corresponding increases in bicarbonate- and carbonate-ion concentrations. Where the increases are slight, the water is not sufficiently alkaline to induce the growth of green algae. The water of mountain lakes remains acidic and diatoms are the only plankton where green algae rarely grow. Meanwhile, the decay of dead diatoms produces biogenic carbon dioxide and compensates for the depletion of carbon dioxide caused by the photosynthesis of living diatoms.

The pH increase and calcite-precipitation are greatly accentuated, however, in lakes where green algae grow in late spring and summer. The photosynthesis of the calcareous algae to make protoplasm, like that of siliceous algae, causes a depletion of dissolved carbon dioxide. The depletion causes an increase of carbonate-ion concentration in the microchemical environment adjacent to the living green algae where the carbonate ion-concentration is sufficiently increased to result in calcite-saturation.

The start of calcite-precipitation by the green-algae growth is the start of the problem. With the decrease of pH value and the dissolved carbon dioxide in lake water, carbon dioxide is changed into carbonate ions to be precipitated as calcite. The lake water becomes then even more depleted in carbonic acid. The carbon dioxide needed by organism for photosynthesis to make protoplasm has to be supplied from the atmosphere and this supply of atmospheric carbon dioxide is unlimited. Only the concentration of nutrients places a limit for the green algae growth. In nutrient-rich waters, the growth continues and causes further precipitation of calcium carbonate. The cycle thus continues and the natural waters are polluted by algal growth.

Algal growth could be prevented when the nutrient supply is reduced or totally cut off. Such attempts to suppress algal growth have not been successful. Our invention teaches that the chain reactions of algae growth—calcite precipitation — algae growth can be broken if the natural water is induced to change its pH through the introduction of a chemical. If, for example, the natural water becomes acidic, the precipitation of calcite could be prevented. The consequence is to prevent the extraction of atmospheric carbon dioxide by green algae for photosynthesis. The "vicious circle" is broken, and the effect is a suppression of green-algae growth.

DESCRIPTION OF THE INVENTION

Chemical experiments relating algal growth to pH of water explain the observation that green algae flourish in very alkaline water. That the Dian Ci water has become an "algal soup" is not surprising, in view of the pH value of 9, the hydrogen-ion concentration of the acidity is $\frac{1}{100}^{th}$ that of neutral water. Experiments have also been carried out to add acid to suppress plankton. It is found, for example, that the growth of green algae in Dian Ci Lake water is totally inhibited after the pH of the water becomes 6.0 or more acidic when hydrochloric acid is added. The experiments thus verified the theory that the growth of green algae can be suppressed through the acidification of natural waters. To suppress plankton growth in a large lake through the addition of hydrochloric acid, is, however, not economically feasible, and such addition would also be a health hazard.

Two common kinds of algae grow in natural waters. Diatoms grow in the spring when the temperature is moderately cool and when the pH value is not very high. Diatoms extracts biogenically produce carbon dioxide in nutrient-rich waters to produce protoplasm and siliceous skeletons. The spring sediments of many lakes are exclusively diatoms frustules. The fact indicates that green algae do not compete successfully with diatoms in the nutrient-rich waters of the spring. Green algae begin to grow and lacustrine chalk begins to precipitate in early summer and continue through the summer when diatom growth is inhibited because diatoms are reproduced only in the spring. The green algae become the exclusive consumer of the nutrients in water. The growth of algae extracts dissolved carbon dioxide in water. Isotope tracers indicate that the depletion is compensated by atmospheric carbon dioxide. The high pH value of the water dictates that carbonate-ion predominates and thus leads to calcite precipitation.

The invention teaches a process of suppression of algal growth through the introduction of carbon dioxide. An area of a lake is isolated or semi-isolated from the rest of the lake. Inverted cylinders e.g. are fixtures immersed in that part of the lake. Carbon dioxide from a source on shore is pumped into the cylinders. The gas pumped in is then dissolved so that the water equilibrating with the gas becomes acidic. The acidic water with a pH of 6.5 to 7.5 prevents the precipitation of calcite. The acidified water can then be pumped out for further treatment.

The acidified water has little algal growth in the spring. The acidified water can be pumped into the lake. Diatoms blooms in such acidified lake water and green algae cannot compete successfully. The depletion of nutrients by diatoms in acidified water will prevent the growth of green algae even when summer comes.

Where green-algae growth has started in summer, the acidified water will have dead debris of green algae. Our Chinese Patent Application No. 03 123 273.6 teaches the filtering of algal debris as acidified lake water seeps through an integrated hydrologic circuit to filter the debris. In lakes on the side of large cities, such an Dian Ci near Kunming, the filtered lake water could be supplied for urban consumption.

Waste water after urban consumption has commonly a high pH of more than 8. Little effort has been made to change the pH of the waste water treated in water-treatment plants. This invention teaches that the waste-water treatment, in addition to the usual procedures, should include acidification so that the treated waste-water emptying into the lake will have a pH of 6.5 to 7 instead of more than 8. Green algae growth tends to be suppressed in such treated waters even at the summer season.

The cyclic treatment of lake acidification could proceed at a fast pace. Where the city population requires a supply of 0.3 million cubic meters per day, the recycling of acidified water could be 100 million cubic meters per day. With such a process even a lake with 1 billion cubic meters water could be cleaned up within 10 years through the suppression of green-algae growth.

Carbon dioxide is the most common waste gas produced by burning of fossil fuel, such as coal and oil. Another source of carbon dioxide is the burning of lime to make cement.

When the method is adopted to treat polluted lakes, there should preferably be ordinances forbidding the release of industrially produced carbon dioxide from plants and factories directly into air. Carbon dioxide produced by the burning of fossil fuels and the burning of lime should be collected for acidification of polluted lakes. Such a regulation could not only make available carbon dioxide for the cleaning up of polluted lakes, but the diversion of carbon dioxide to acidified water would minimize the pollution of atmosphere by greenhouse gases and reduce the greenhouse warming of the planet.

In the present invention, the process for suppressing the growth of green algae in aqueous systems includes treating the water with carbon dioxide to acidify the water wherein dead algal debris are filtered out of the treated water and burnt for producing chemical fertilizer.

The invention claimed is:

1. A process for suppressing growth of green algae in an aqueous system comprising recovering carbon dioxide from industrial produced waste containing carbon dioxide, wherein the carbon dioxide is produced by burning of fossil fuels or of lime; treating water of an aqueous system with said carbon dioxide recovered from said industrial produced waste to acidify the water; filtering out of the water, following acidification of the water, dead algal debris; and burning the dead algal debris filtered out to produce chemical fertilizer.

2. A process according to claim 1, wherein said aqueous system is waste water and said waste water is acidified with said carbon dioxide before said waste water is emptied into a lake or river.

3. A process for suppressing growth of green algae in an aqueous system comprising recovering carbon dioxide from industrial produced waste containing carbon dioxide, treating water of an aqueous system with said carbon dioxide recovered from said industrial produced waste to acidify the water, form dead algal debris, filtering out of the water, following acidification of the water, the dead algal debris, and burning the dead algal debris filtered out to produce chemical fertilizer.

* * * * *